(12) United States Patent
Harper et al.

(10) Patent No.: US 7,694,012 B1
(45) Date of Patent: Apr. 6, 2010

(54) SYSTEM AND METHOD FOR ROUTING DATA

(75) Inventors: Glenn Earle Harper, Grapevine, TX (US); Jennifer Jo Briscoe, Centennial, CO (US)

(73) Assignee: Galileo International L.L.C., Rosemont, IL (US)

( * ) Notice: Subject to any disclaimer, the term of this patent is extended or adjusted under 35 U.S.C. 154(b) by 368 days.

(21) Appl. No.: 11/712,198

(22) Filed: Feb. 28, 2007

Related U.S. Application Data (60) Provisional application No. 60/777,742, filed on Feb. 28, 2006.

(51) Int. Cl.
*G06F 15/16* (2006.01)
(52) U.S. Cl. ...................... 709/238; 709/239
(58) Field of Classification Search ................... 709/238
See application file for complete search history.

(56) References Cited

U.S. PATENT DOCUMENTS

| | | | |
|---|---|---|---|
| 5,781,910 A * | 7/1998 | Gostanian et al. | 707/201 |
| 5,828,847 A * | 10/1998 | Gehr et al. | 709/239 |
| 6,938,031 B1 * | 8/2005 | Zoltan et al. | 707/1 |
| 7,325,045 B1 * | 1/2008 | Manber et al. | 709/219 |
| 2005/0149372 A1 * | 7/2005 | Kite et al. | 705/8 |

* cited by examiner

*Primary Examiner*—Firmin Backer
*Assistant Examiner*—Patrick Nagel
(74) *Attorney, Agent, or Firm*—Lerner, David, Littenberg, Krumholz & Mentlik, LLP (57) ABSTRACT

A method of and system for routing data includes passing a data request to a primary data source, encountering a type of error in accessing the requested data from the primary data source, and selecting one of a plurality of alternate data sources based on the type of error encountered.

16 Claims, 8 Drawing Sheets

EXAMPLE OF DATA ROUTING RULES

```
<CADASConfig>
    <Application Name="Application1">
        <ConnectionPool RuleName="Pool150" Order="1"/>
        <ConnectionPool RuleName="Pool151" Order="2"/>
        <ConnectionPool RuleName="Pool152" Order="3"/>
    </ApplicationName>
    <Application Name="Application2">
        <ConnectionPool RuleName="Pool150" Order="1"/>
        <ConnectionPool RuleName="Pool153" Order="2"/>
        <ConnectionPool RuleName="Pool154" Order="3"/>
    </ApplicationName>
```
*This section lists the applications that are configured to use CA-DAS, the rule sets that a connection pool uses and the starting order of preference for the application.*

```
<FailOverRules RuleName="Pool150" DBType="DB2-8.2" Server="PrimaryServer30">
    <Error Type="DBError" ErrorNumber="10000">
        <FailToPool Order="1" RuleName="Pool151" />
        <FailToPool Order="2" RuleName="Pool152" />
    </Error>
    <Error Type="DBError" ErrorNumber ="10001">
        <FailToPool Order="1" RuleName="Pool152" />
        <FailToPool Order="2" RuleName="Pool151" />
    </Error>
    <Error Type="TimeOut" Seconds="10">
        <FailToPool Order="2" RuleName="Pool152" />
    </Error>
    <Error Type="Network" ErrorNumber ="10">
        <FailToPool Order="2" RuleName="Pool151" />
        <FailToPool Order="2" RuleName="Pool152" />
    </Error>
</FailOverRules>
```
*This section defines the rules for each error condition that a connection pool might encounter, the server to which the connection pool is assigned.*

*An error definition has a type and a failover order and the fail to pool destination.*

```
<FailOverRules RuleName="Pool151" DBType="Oracle-10g" Server="Pool151">
    <Error Type="DBError" ErrorNumber="41000">
        <FailToPool Order="1" RuleName="Pool150" />
        <FailToPool Order="2" RuleName="Pool152" />
    </Error>
    <Error Type="DBError" ErrorNumber ="231">
        <FailToPool Order="1" RuleName="Pool152" />
        <FailToPool Order="2" RuleName="Pool150" />
    </Error>
    <Error Type="TimeOut" Seconds="3">
```
*This section is another rule definition for another data server, data type with different error codes and failover servers.*

FIGURE 7A

```xml
        <FailToPool Order="2" RuleName="Pool152" />
    </Error>
    <Error Type="Network" ErrorNumber ="1050">
        <FailToPool Order="2" RuleName="Pool150" />
        <FailToPool Order="2" RuleName="Pool152" />
    </Error>
</FailOverRules>
<FailOverRules RuleName="Pool152" DBType="Oracle-10g" Server="Pool152">
    <Error Type="DBError" ErrorNumber="41000">
        <FailToPool Order="1" RuleName="Pool150" />
        <FailToPool Order="2" RuleName="Pool151" />
    </Error>
    <Error Type="DBError" ErrorNumber ="231">
        <FailToPool Order="1" RuleName="Pool151" />
        <FailToPool Order="2" RuleName="Pool150" />
    </Error>
    <Error Type="TimeOut" Seconds="3">
        <FailToPool Order="2" RuleName="Pool151" />
    </Error>
    <Error Type="Network" ErrorNumber ="1050">
        <FailToPool Order="2" RuleName="Pool150" />
        <FailToPool Order="2" RuleName="Pool151" />
    </Error>
</FailOverRules>
<FailOverRules RuleName="Pool153" DBType="DB2-8.2" Server="PrimaryServer30">
    <Error Type="DBError" ErrorNumber="10000">
        <FailToPool Order="1" RuleName="Pool152" />
        <FailToPool Order="2" RuleName="Pool151" />
    </Error>
    <Error Type="DBError" ErrorNumber ="10025">
        <FailToPool Order="1" RuleName="Pool151" />
        <FailToPool Order="2" RuleName="Pool152" />
    </Error>
    <Error Type="TimeOut" Seconds="3">
        <FailToPool Order="2" RuleName="Pool152" />
    </Error>
</FailOverRules>
</CADASConfig>
```

FIGURE 7B

SYSTEM AND METHOD FOR ROUTING DATA

CROSS-REFERENCE TO RELATED APPLICATION(S)

This application claims the benefit of the filing date of U.S. Provisional Patent Application No. 60/777,742 filed Feb. 28, 2006, the disclosure of which is hereby incorporated herein by reference.

BACKGROUND OF THE INVENTION

A variety of methods and systems facilitate data routing via a network.

For example, Oracle® offers a Real Application Clusters™ option to support transparent deployment of a single database across a cluster of hardware servers. If a node in the cluster fails, the database continues running on the remaining nodes.

Additionally, Continuent™ offers M/cluster™ technology that helps ensure a number of database servers remain synchronized over time.

IBM® offers an automatic client reroute facility that allows a client application to transparently connect to a standby server without exposing a communications error to the client application.

Moreover, a variety of RAID ("Redundant Array of Inexpensive (or Independent) Disks") systems have been developed. In general, RAID systems provide a data storage scheme using multiple hard drives to replicate data among the drives. Replication for storage systems such as EMC's, IBM's and Hitachi's point to point replication are also known.

While prior systems exist which automatically reroute data from a failed first source (such as an ODBC database or RAID disk) to a second source (such as another ODBC database or another RAID disk), further advances in data routing are required.

SUMMARY OF THE INVENTION

In one aspect of the present invention, a method of routing data over a network is provided wherein the method includes requesting data from a first data source; receiving an error in response to the request; selecting either a second data source or a third data source based on the type of the error; and requesting the data from the selected data source.

Another aspect of the present invention includes sending first information over a network and receiving second information over the network wherein the second information was generated as described above.

Preferably, the method includes referring to a collection of rules to select one of the data sources, where each rule associates a type of error with at least one data source, and where at least two rules are associated with different data sources. The step of requesting data may be performed at one node of the network and the collection of rules may be stored at another node of the network.

Moreover, the data may be requested from the first data source in response to a request for data from an application program. Although an error may be received and another data source then selected, the reception of the error and selection of the other data source may be transparent to the application program.

The different types of errors may refer to, by way of example, timed out errors on the one hand and corruption of the requested data on the other. In such an instance, the selected data source may be geographically proximate to the first data source if the error type relates to a timed out error, but the selected data source may be geographically remote from the first data source if the error type relates to a corruption of data.

The selected data source may store data in a different format than the first data source.

Preferably, the data traffic across the network is statistically analyzed so that selecting one of the data sources is further based on the statistical analysis. The data sources may also be monitored with respect to their availability, and the rules for selecting data sources modified in response to a change in the availability of a data source.

Yet a further aspect of the invention provides a system which includes, a primary database server, a plurality of alternate database servers, and an application server. The application server is configured to send a data request to the primary data source. Upon encountering an error in response to the request, the application server selects at least one of the alternate database servers based on the type of error encountered.

The foregoing system may also include application code and management code, both being adapted to run on the application server. The management code is adapted to select one of the alternate database servers in a manner that is transparent to the application code.

The system may also include a service management server coupled to the application server. The service management server is adapted to store a collection of rules that identify relationships between types of errors and the plurality of alternate database servers. The management code selects one of the alternate database servers based on these rules.

The primary database server, the database server and the service management server may also be at different nodes of a network.

Yet another aspect of the invention provides a system having a plurality of requesting computers, a plurality of data sources and at least one management computer. Each requesting computer is at a different node of a network from another requesting computer, and is also configured to request data from a data source over the network. Each data source at a different node of a network from another data source, and is configured to provide data in response to a data request. The is at a different node of the network than at least one of the requesting computers. Moreover, the management computer is configured to provide a requesting computer with at least one alternate data source, such that the alternate data source is identified based on the reason why a different data source did not provide the data requested the requesting computer.

Preferably, the management computer also identifies the alternate data source based the traffic over the network. The requesting computers may also send their data requests to the management computer and receive, in response, the identity of the data source that should receive the data request.

BRIEF DESCRIPTION OF THE DRAWINGS

FIGS. 7A and 7B illustrates rules in accordance with an aspect of the invention.

DETAILED DESCRIPTION

One aspect of the present invention provides a method and system for the intelligent routing of data between data sources and applications using the data.

Figure 1:
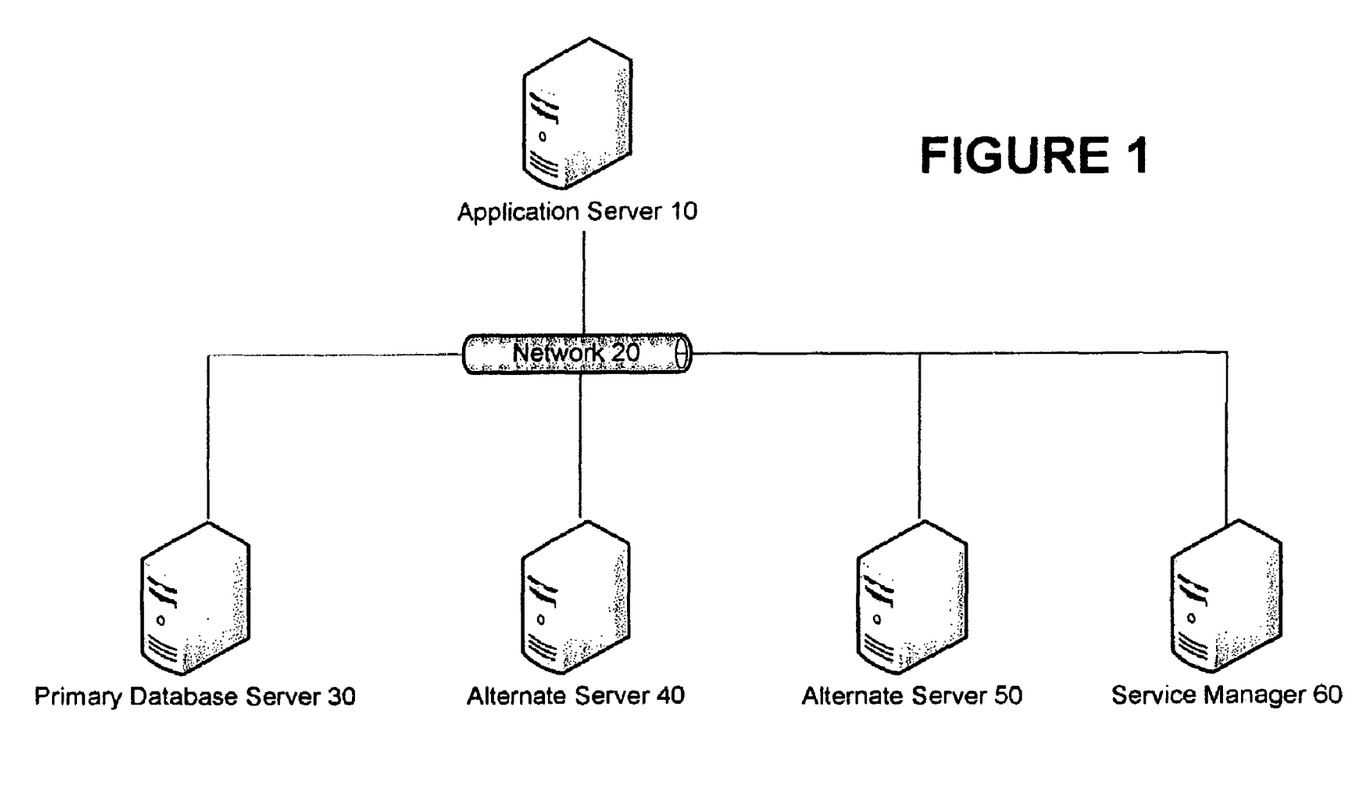
FIG. 1 is a schematic diagram of a network in accordance with an aspect of the invention.

FIG. 1 shows a network in accordance with an aspect of the invention. A software application runs on the application server 10. The application may be any software application which requests or sends data to or from a database or other collection of data.

The Application Server 10 communicates with other computers over a network 20. It will also be understood that the application server will typically, though not necessarily, comprise a computer on a distributed network that handles the business logic between user and other business applications or databases. Thus, the application server will typically receive information sent by end user computers, retrieve data (as explained in more detail below) in response to the information sent by the end user computer, and send information back to the end user computers based on the retrieved data. As will also be understood, the server and other computers may comprise any device capable of processing information in accordance with instructions to produce a result, such as a microprocessor or other processor processing programs. Network 20 may be any network known to those of ordinary skill in the art, including LANs and world-wide networks.

Database servers 30, 40 and 50 may be any database server or other collection of data known to those of ordinary skill in the art, and may be stored at different nodes of the network 20 relative to Application Server 10. For example, the data may comprise customer information stored in tables within an SQL-compliant database. The database servers may also comprise industry-standard relational database products such as Oracle, DB2, and Microsoft SQL Server, may be capable of communication with a Type 2 or Type 4 JDBC driver, ODBC drivers or the like, and may further be capable of database-to-database replication. Although only three database servers are shown in FIG. 1, the techniques disclosed herein may be used in connection with any number of servers or other computers.

Primary database server 30 comprises the preferred source of data for the application software. That is, at the moment in time when an application requires data from a database stored on a database server, the preferred database server is considered to be the server from which the system attempts to retrieve data prior to trying other sources.

Alternate servers 40 and 50 comprise other sources of data for the application software. In one aspect of the present invention, alternate servers 40 and 50 comprise alternate sources for some or all of the data in primary database server 30. For example, alternate server 40 may include some of the data in primary database server 30 and alternate server 50 may include other data in primary database server 30. Alternatively, as noted above, the alternate servers may be capable of providing all of the data that primary database server 30 is capable of providing.

Service manager 60 contains information which may be used by connected systems. As explained in more detail below, the service manager 60 preferably comprises a server and program which tracks information associated with the transfer of data to and from the database servers.

Figure 2:
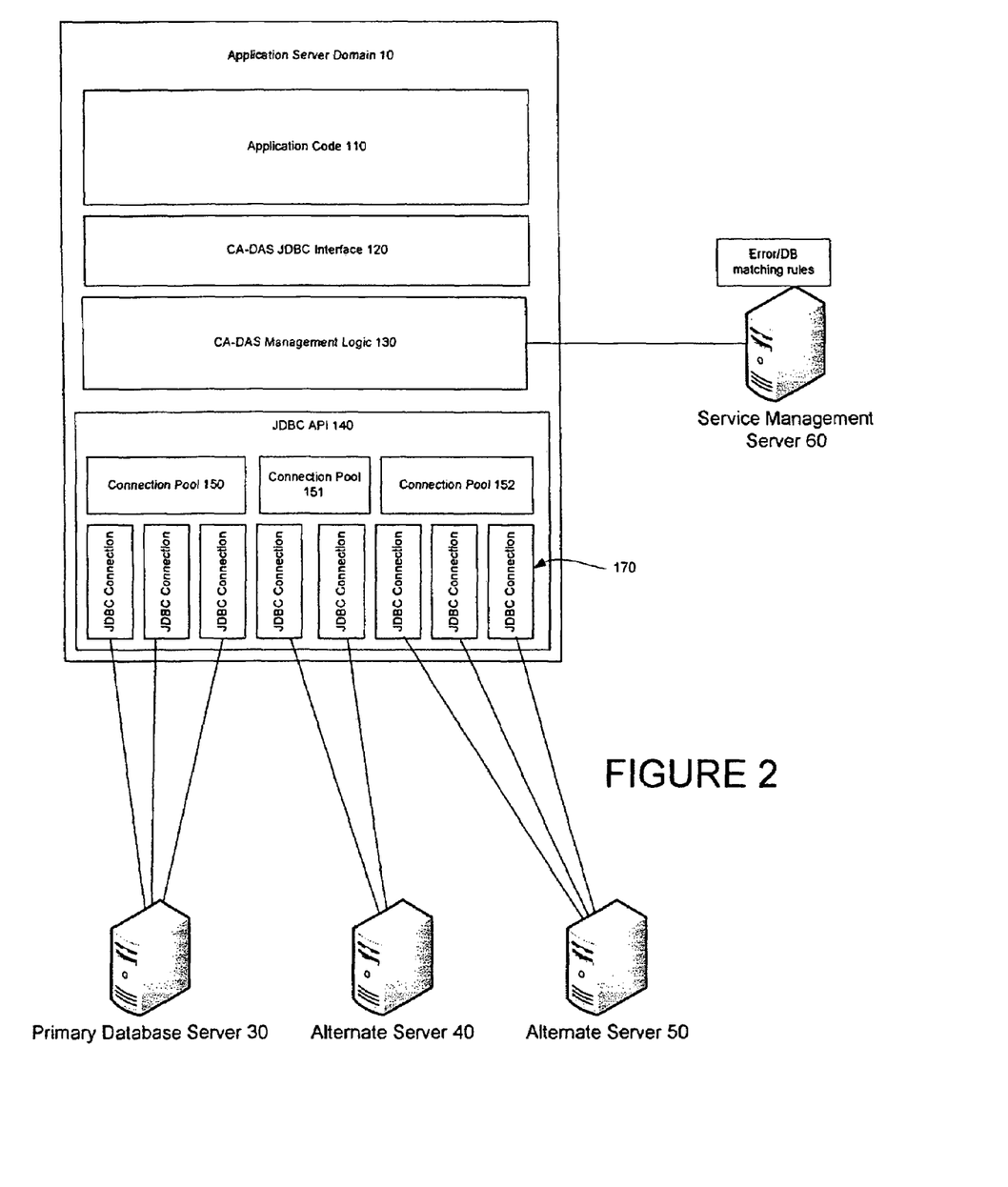
FIG. 2 is a functional diagram of the an application server in accordance with an aspect of the invention.
Figure 3:
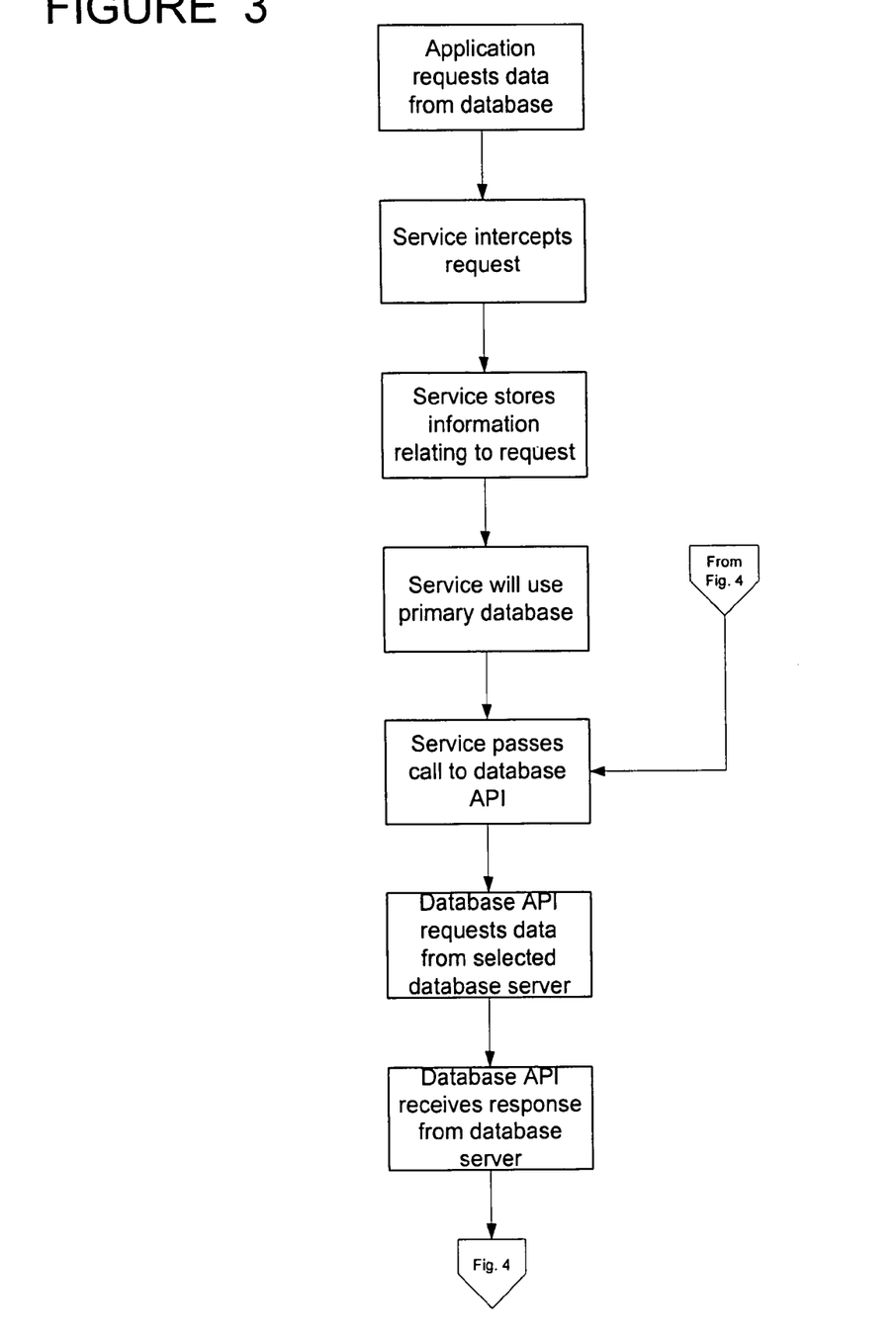
FIG. 3 is a flowchart of an operation in accordance with an aspect of the invention.
Figure 4:
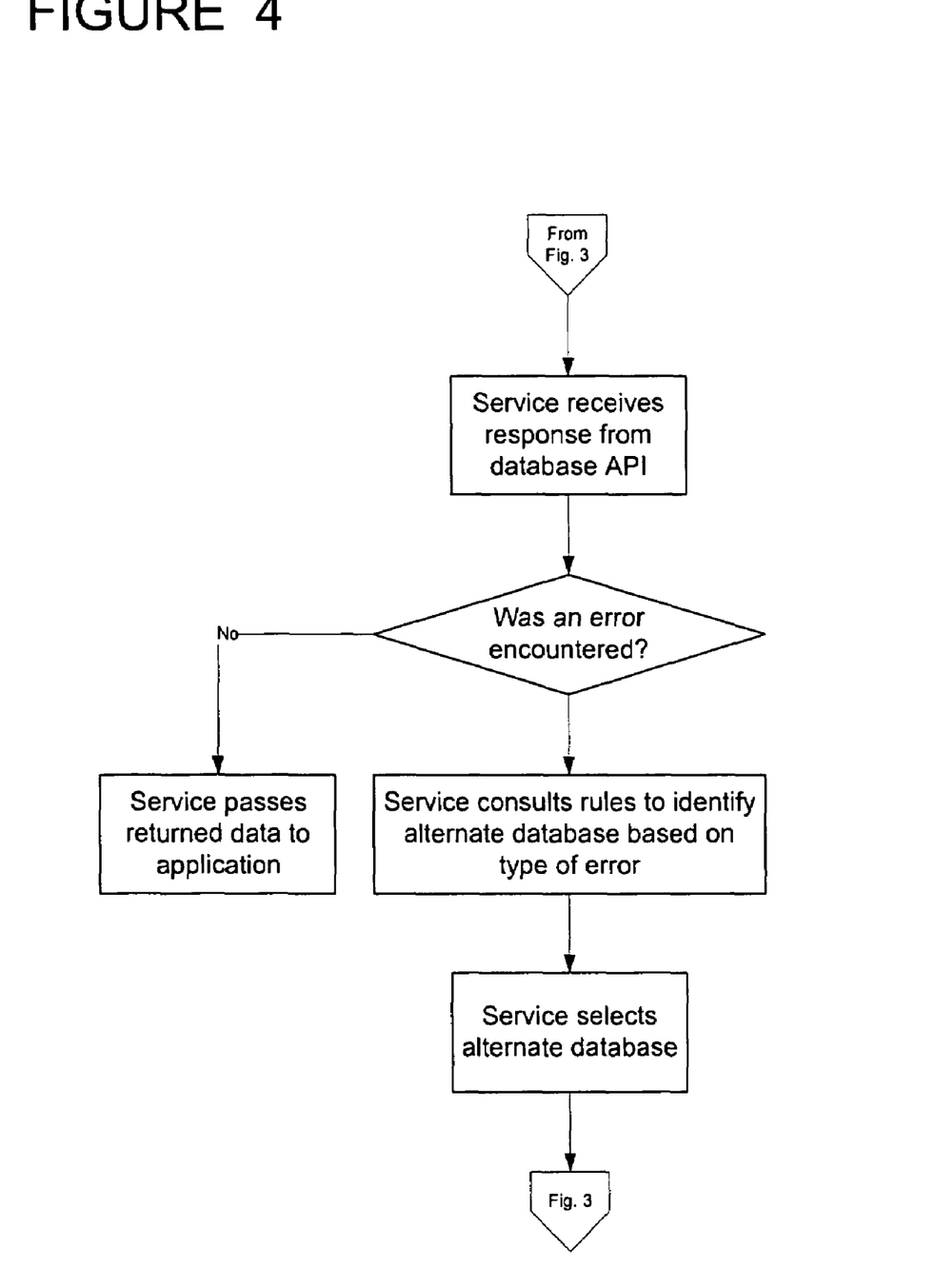
FIG. 4 is a flowchart of an operation in accordance with an aspect of the invention.

FIG. 2 is a functional diagram of the layers of the application server 10 in more detail. In addition to the operations illustrated in FIG. 3, an operation in accordance with a variety of aspects of the method will also be described in connection with FIG. 2. It should be understood that the following operations do not have to be performed in the precise order described below. Rather, various steps can be handled in reverse order or simultaneously.

In one aspect, systems and methods in accordance with the invention are transparent to the application layer. In this regard, application code 110 may be written so as to request data from a registered data source using Java. Database Connectivity API (JDBC) shown at reference numeral 140. However, while the programmer may need to be aware of the database driver or the like, the application code programmer does not need to be aware of the presence of the techniques disclosed herein nor modify his or her code to work with the invention. In some implementations, the connection pool uses a database's specific driver, such as Oracle's JDBC API 10.0.2 to make a connection to that database server.

In one aspect, instructions and routines in accordance with the present invention are stored as a stub on the application server 10.

In a preferred embodiment, the stub wraps around the JDBC such that it intercepts calls to the JDBC API. In that regard, CA-DAS ("Continuous Availability Database Access Service") JDBC Interface 120 is the public interface to the CA-DAS Management Logic 130. CA-DAS JDBC Interface 120 preferably provides at least the same public interface as JDBC 140. However, at least some calls to the JDBC 140, such as requests for data, are intercepted by the CA-DAS JDBC Interface 120 and diverted to CA-DAS Management Logic 130 rather than JDBC 140. The CA-DAS JDBC Interface 120, CA-DAS Management Logic 130 and JDBC 140, together, may act as a direct replacement for a JDBC version 2.0 or later Type 2 or Type 4 driver. Preferably, CA-DAS is written in Java and uses a Java Virtual Machine (JVM) in which to execute, such as JDK 1.4 or later.

Upon receiving a call to the CA-DAS JDBC Interface 120, the CA-DAS Management Logic 130 stores information relating to the request and, depending on the JDBC function called by the application code 110, passes the call to the JDBC 140. For example, when the application code 110 passes the SQL statement "SELECT Name FROM Customer" to the EXECUTE routine (or the like) of the database driver, CA-DAS JDBC Interface 120 intercepts the call and diverts it to CA-DAS Management Logic 130. CA-DAS Management Logic 130 logs the SQL request and passes it to the EXECUTE routine of the JDBC.

As is known to those of ordinary skill in the art, JDBC uses a connection pool to connect to databases. By way of example, JDBC 140 uses connection pool 150 to connect to primary database server 30. The pool 150 uses one of the available JDBC drivers to create JDBC connections 170. The connection is then used to pass data requests to the database and return the database's response. For example, the JDBC may select one of the available JDBC connections 170 from the connection pool 150 maintained by the JDBC 140 for the primary database server 30. The data request is then passed via the connector to the database server and the response—whether it is valid data or an error—is returned along the same connection. Rather than transmitting the SQL data request itself, it will be understood that computer 10 may transmit any information which causes data to be retrieved from a data source in response.

If valid data is returned from the primary database server 30 in response to the data request, the data is passed up via the JDBC 140 to CA-DAS Management Logic 130. CA-DAS Management Logic 130 in turn notes the successful error-free return of data and CA-DAS JDBC Interface 120 passes the resultant record set (or reference to the record set) to application code 110. It will be understood that rather than receiving a record set, the computer 10 may receive any information based on the data retrieved from the database.

However, if JDBC 140 encounters an error accessing the requested data in primary database server 30, CA-DAS Management Logic 130 attempts not to pass the error to application code 110. Rather, CA-DAS Management Logic 130 will select one of the alternate servers based on the type of error encountered when attempting to access the primary database server 30.

CA-DAS Management Logic 130 preferably includes a collection of data defining relationships between error conditions and alternate sources of data (hereafter, "rules"). The rules may be relatively simple, including, for example, mapping particular exceptions in a one-to-one or one-to-many relationship to particular alternative sources of data. The rules may also be complex, comprising more complicated groupings of logical functions. As explained in more detail below, some or all of the rules are preferably stored on the service management server 60 remotely from the CA-DAS Management Logic 130 stub. FIG. 7 illustrates one possible syntax for rules.

Figure 5:
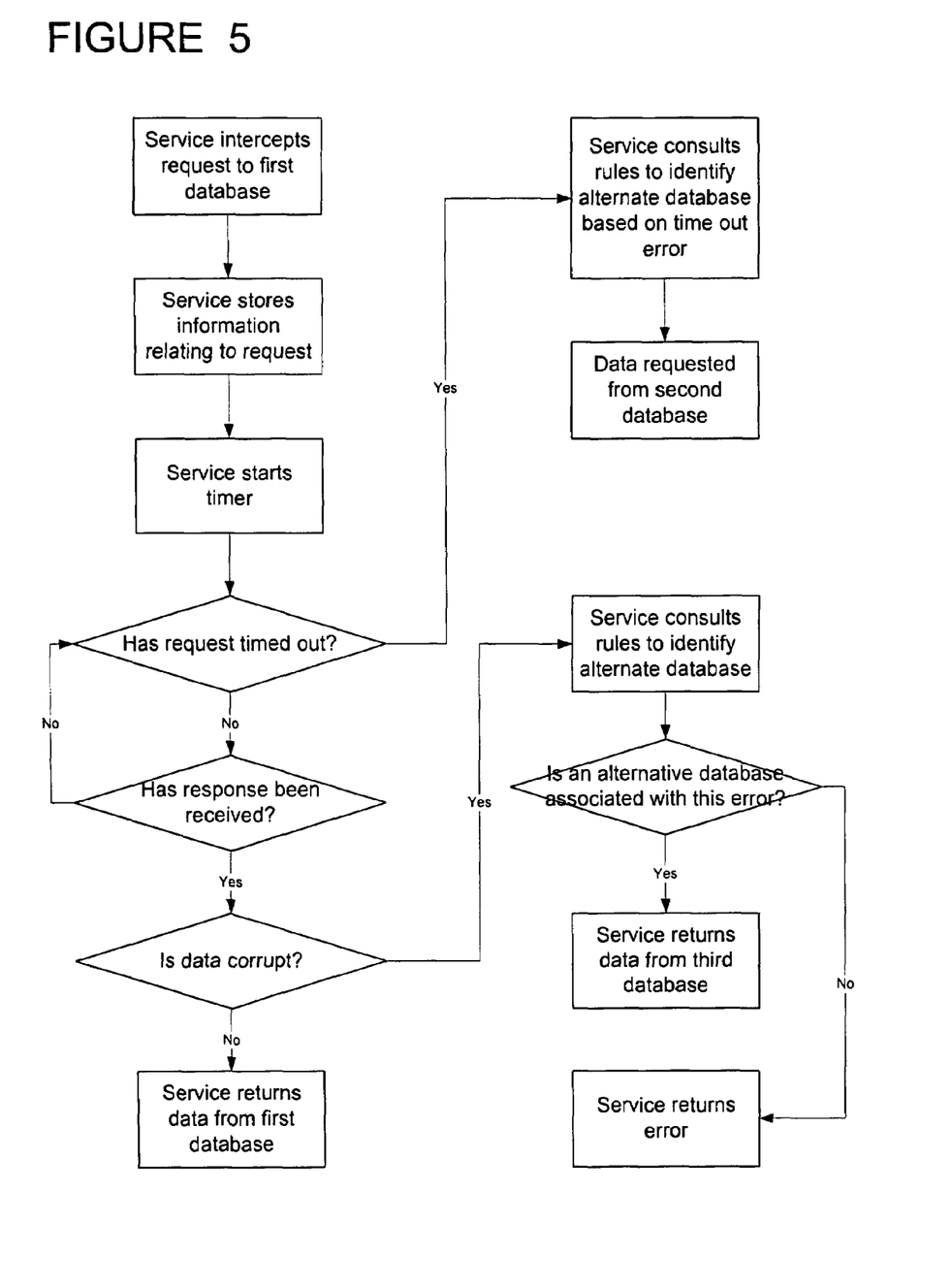
FIG. 5 is a flowchart of an operation in accordance with an aspect of the invention.

Although the invention is not limited to any particular type of errors, the invention is particularly advantageous when selecting alternative data sources based on time-out errors versus corruption errors. Accordingly, the following operation as well as the operation shown in FIG. 5 shall be used as an example, but not a limitation, of one aspect of the invention.

When the CA-DAS Management. Logic 130 logs the data request, it preferably starts a timer and monitors the JDBC 140 for a response. If no response is forthcoming, then it is assumed that the request has "timed out," that is, for known Or unknown reasons the primary database server 30 was apparently too busy to respond to the request. (Alternatively, the database driver such as JDBC 140 may provide its own time-out requests.)

In response to a timed-out error, the CA-DAS Management Logic 130 consults the rules to determine which database to select. For example, a rule may effectively state "If there is a <time out> error when requesting data from the <customer> table in the <primary database 30> server, then route the data request to the <alternate 40> server." In this example, it will be assumed that alternate server 40 is in the same geographic location as primary database server 30 and mirrors the data in primary database server 30. Thus, one reason why time-out requests to primary database server 30 are routed to alternate server 40 and not alternate server 50 may be because the data in primary database server 30 was not corrupted; rather, it was simply and temporarily unavailable because the primary database server 30 was experiencing an unusually high demand for data. Accordingly, the fastest and most accurate alternative to the primary server may be the mirror server right next to it.

If the error indicates that the data in primary database server 30 is corrupt, however, then the CA-DAS Management Logic 130 may select alternate server 50. For example, a rule may effectively state "If there is a <data corruption> error when requesting data from the <customer> table in the <primary database 30> server, then route the data request to the <alternate 50> server." Rather than acting as a mirror in physical proximity to the primary database server 30, the alternate server 50 in this example is geographically remote and does not contain an exact replica of the data in the primary database server 30. Rather, alternate server 50 may be located in an entirely different continent from alternate server 40, and while it substantively stores the same customer information as primary database server 30, it may store the data in a very different format (such as ODBC or XML). Corrupt data errors would cause requests to be routed to alternate server 50 instead of alternate server 40 because, if alternate server 40 is a mirror of primary database server 30, the data on alternate server 40 may be as corrupt as primary database server 30.

No matter which alternate server is selected, the CA-DAS Management Logic 130 may direct the JDBC 140 to the connection pool (such as connection pool 151 or 152) associated with the selected alternate server. If valid data is received in response, the data is passed through the JDBC 150, CA-DAS Management Logic 130 and CA-DAS JDBC Interface 120 to the application code 110.

Accordingly, one aspect of the invention provides a system and method which automatically and intelligently routes data requests to different sources of data, based on the type of error, in a manner which is transparent to both the requesting application and the sources of data.

Preferably, the routing rules also include rules for redirecting the data request from the alternate server if the request to the alternate server also generates an error. For example, if the data request was redirected to alternate server 40 because of a time-out and the alternate server 40 returns an error (time-out or otherwise), then the rule may indicate that the data request should be redirected yet again to alternate server 50. In some implementations, the rules do not address all possible errors. For example, if there is no rule associated with an error, the error may be passed back up to the application code 110. Yet further, some rules may define when an error is passed up to the application code 110 rather than used to redirect the request for data.

Figure 6:
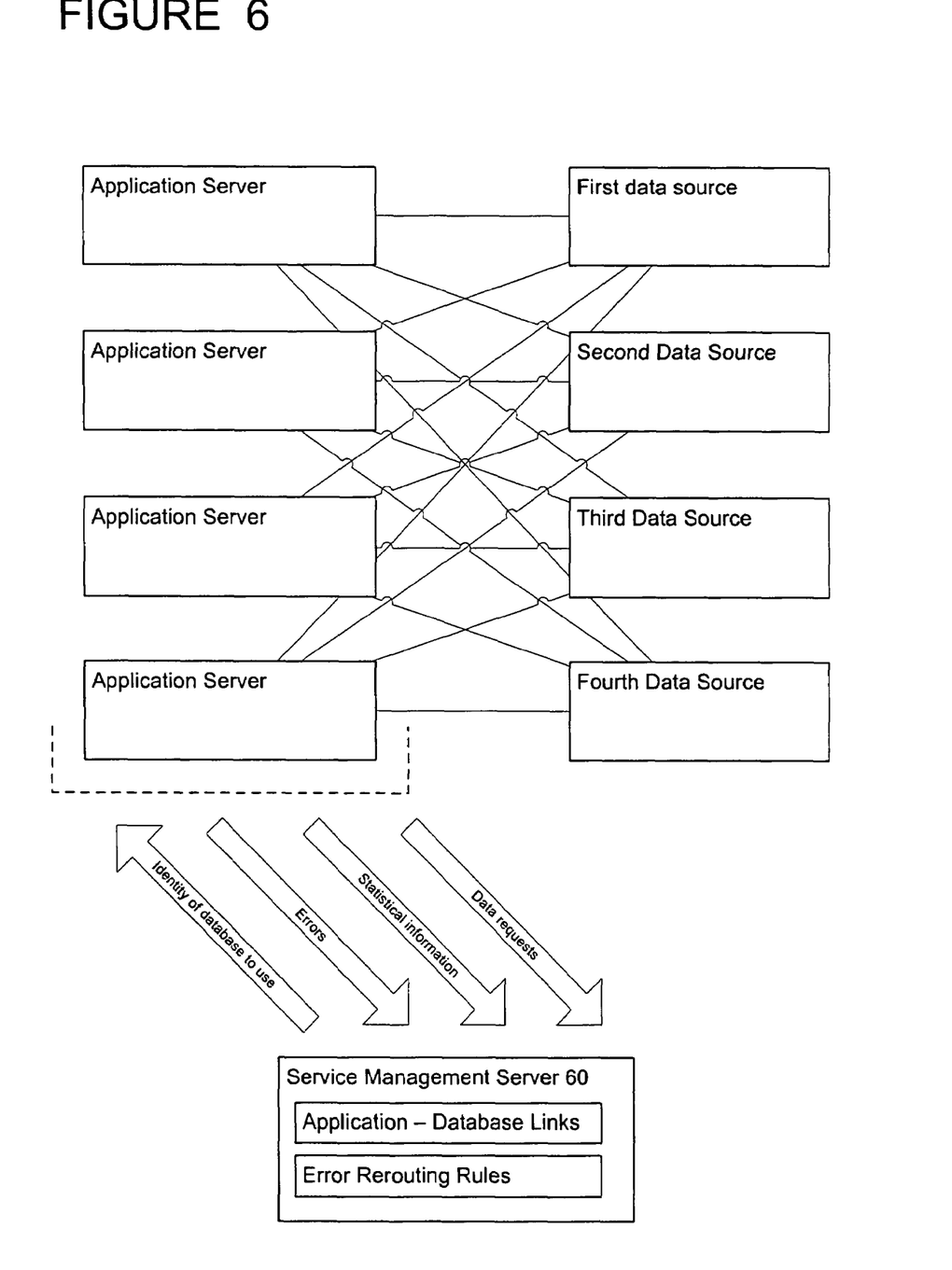
FIG. 6 is a schematic diagram of a central service management server in accordance with an aspect of the invention.

Although the routing rules may be stored in CA-DAS Management Logic 130, preferably the rules are not stored in the application server 10 but rather in the service management server 60. For example, and as schematically illustrated in FIG. 6, upon receiving an error, CA-DAS Management Logic 130 sends an identification of the error (and potentially other information such as the data request and the identity of the application code 110) to the service management server 60. Service management server 60, in turn, identifies the alternate server to which the data request should be routed.

This aspect of the invention is particularly advantageous because it can coordinate many, indeed hundreds, of links between applications and data sources. For example, if a few application servers running similar applications were going to a few database servers because of error problems, and many hundreds of application servers were going elsewhere, inconsistencies may be introduced between the data sources. When the error conditions are fixed, the inconsistencies could prove fatal to the proper operation of the system. Accordingly, by centrally storing the rules, service management server 60 can make sure that data requests are routed if possible to the same alternate servers.

By staying in communication with the stubs on the application servers, the service management server 60 may also be provided with logic which routes traffic based on a statistical analysis of the data traffic. For example, if service management server 60 receives many time-out errors in response to requests for data from alternate server 40, then the service management server 60 may change its rules such that alternate server 50 will become the backup to the customer table in primary database server 30 rather than alternate server 40.

The routing rules may thus rely on a statistical analysis of the current state of the entire system (not just the database servers typically accessed by the application), and can provide human-readable reports of those statistics, such as the average response time and other trends per transaction or server. Some of the functions of the service management server 60 may be performed by central monitoring applications such as HP Openview and Tivoli.

In yet another aspect of the invention, the service management server 60 may also be consulted for all data requests to the database servers on the network. Therefore, if any of the database servers need to be shut down for maintenance or the like, the service management server 60 could be informed of that fact. When the CA-DAS Management Logic 130 on an application server notifies service management server 60 that data has been requested from the currently shut-down server, the service management server 60 can instruct the CA-DAS Management Logic 130 where to route the data request—without the CA-DAS Management Logic 130 waiting for an error. Alternatively, the service management server 60 may notify the CA-DAS Management Logic 130 that calls to a particular database server should be assumed to fail even if the database server is actually available. In this regard, the service management server 60 can not only assist in the handling of failovers, it can effectively cause them.

Yet further, the CA-DAS Management Logic 130 may send alerts to the service management server 60 regarding errors it encounters thus allowing the service management server 60 to modify its rules or note the event for future analysis.

Service management server 60 may also be used to create, modify and delete the rules and publish the rules to CA-DAS Management Logic 130.

As noted above, in one aspect the invention is transparent to the programmer of the application code 110, i.e., the invention assists in the management of data even if the programmer of the application code 110 is unaware of it.

However, in another aspect of the invention, additional features are made available to the programmer if the programmer opts to take advantage of them. For example, the programmer may change the amount of time that the CA-DAS Management Logic 130 uses to determine whether a transaction has experienced a time out error. The programmer may also instruct the CA-DAS Management Logic 130 to ignore the rules for a particular transaction and pass any errors to the application code 110 for handling.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

What is claimed is:

1. A method of routing data over a computer network, the method comprising:
   requesting data over the computer network from a first data source at a first computer of the network;
   receiving an error in response to the request;
   selecting either a second data source at a second computer of the network or a third data source at a third computer of the network based on the type of the error, wherein each data source is distinct from the other data sources, wherein the selected data source is geographically remote from the first data source if the error type relates to a corruption of data, and wherein the selected data source is geographically proximate to the first data source if the error type relates to a timed out error; and
   requesting the data from the selected data source.

2. A method of routing data, the method comprising:
   sending first information over a computer network; and
   receiving second information over the network;
   whereby the second information is generated by: requesting data from a first data source at a first computer of the network, the data being based on the first information; receiving an error in response to the request; selecting either a second data source at a second computer of the network or a third data source at a second computer of the network based on the type of the error, wherein each data source is distinct from the other data sources, wherein the selected data source is geographically remote from the first data source if the error type relates to a corruption of data, and wherein the selected data source is geographically proximate to the first data source if the error type relates to a timed out error; requesting the data from the selected data source, and; generating the second information based on data received from the selected data source.

3. The method of claim 1 or 2 further comprising referring to a collection of rules to select one of the data sources, where each rule associates a type of error with at least one data source, and where at least two rules are associated with different data sources.

4. The method of claim 3 wherein the step of requesting data is performed at one node of the network and the collection of rules are stored at another node of the network.

5. The method of claim 1 or 2 wherein the requesting of data from a first data source is performed in response to a request for data from an application program, and wherein receiving an error and selecting a data source is performed in a manner transparent to the application program.

6. The method of claim 1 or 2 wherein one type of error is a timed out error and the other type of error relates to a corruption of the requested data.

7. The method of claim 1 or 2 wherein the selected data source stores data in a different format than the first data source.

8. The method of claim 1 or 2 further comprising:
   statistically analyzing data traffic across the network,
   wherein selecting one of the data sources is further based on the statistical analysis.

9. The method of claim 1 or 2 further comprising:
   monitoring availability of the second and third data sources; and
   modifying rules for selecting one of the data sources in response to a change in the availability of at least one data source.

10. A system comprising:
    a primary database server;
    a plurality of alternate database servers; and
    an application server configured to:
    send a data request to the primary data server, and
    upon encountering an error in response to the request, selecting at least one of the alternate database servers based on the type of error encountered, wherein the selected alternate database server is physically geographically remote from the primary database server if the error type relates to a corruption of data, and wherein the selected alternate database server is physically geographically proximate to the primary data source if the error type relates to a timed out error.

11. The system of claim 10 further comprising:
application code run on the application server, and
management code run on the application server,
wherein the management code selects one of the alternate database servers in a manner that is transparent to the application code.

12. The system of claim 11 further comprising:
a service management server coupled to the application server and adapted to store a collection of rules that identify relationships between types of errors and the plurality of alternate database servers,
wherein the management code selects one of the plurality of alternate database servers based on the rules.

13. The system of claim 12 wherein the primary database server, at least one of the alternate database servers, and the service management server are at different nodes of a network.

14. A system of routing data, the system comprising:
a plurality of requesting computers, each requesting computer being (i) at a different node of a network from another requesting computer, (ii) configured to request data from a data source over the network;
a plurality of data sources, each data source being (i) at a different node of a network from another data source, and (ii) configured to provide data in response to a data request; and
at least one management computer, the management computer being (i) at a different node of the network than at least one of the requesting computers, (ii) configured to provide a requesting computer with at least one alternate data source, and (iii) configured to identify the alternate data source based on the reason why a different data source did not provide the data requested by a data request from a requesting computer, wherein the identified alternate data source is geographically remote from the different data source if the reason relates to a corruption of data, and wherein the identified alternate data source is geographically proximate to the different data source if the reason relates to a timed out error.

15. The system of claim 14 wherein the management computer is configured to identify an alternate data source based on both the reason why a different data source did not provide the requested data, and information relating to the traffic over the network.

16. The system of claim 15 wherein the requesting computer sends a data request to the management computer and receives, in response, the identity of the data source that should receive the data request.

* * * * *